US010032046B1

(12) United States Patent
Hayashi et al.

(10) Patent No.: US 10,032,046 B1
(45) Date of Patent: Jul. 24, 2018

(54) PROTECTING CONFIDENTIAL INFORMATION

(71) Applicant: International Business Machines Corporation, Armonk, NY (US)

(72) Inventors: Daisuke Hayashi, Tokyo (JP); Keisuke Nitta, Koshigaya (JP); Sayaka Tamai, Tokyo (JP); Fumihiko Terui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/826,858

(22) Filed: Nov. 30, 2017

Related U.S. Application Data

(63) Continuation of application No. 15/635,589, filed on Jun. 28, 2017.

(51) Int. Cl.
| | | |
|---|---|---|
| *G06F 21/62* | (2013.01) | |
| *G06F 17/27* | (2006.01) | |
| *H04L 29/06* | (2006.01) | |

(52) U.S. Cl.
CPC ...... *G06F 21/6245* (2013.01); *G06F 17/2735* (2013.01); *G06F 21/6227* (2013.01); *H04L 63/029* (2013.01)

(58) Field of Classification Search
CPC .................................................. G06F 21/62
USPC .............................. 726/22, 26; 713/161, 189
See application file for complete search history.

(56) References Cited

U.S. PATENT DOCUMENTS

| | | | |
|---|---|---|---|
| 8,713,110 B2 | 4/2014 | Oliver et al. | |
| 9,160,719 B2 | 10/2015 | Marlow et al. | |
| 2004/0103147 A1* | 5/2004 | Flesher | G06F 17/30168 709/204 |
| 2005/0138110 A1* | 6/2005 | Redlich | C07K 14/70575 709/201 |
| 2008/0181396 A1 | 7/2008 | Balakrishnan et al. | |
| 2010/0077205 A1 | 3/2010 | Ekstrom et al. | |
| 2017/0124037 A1 | 5/2017 | Hayashi et al. | |

OTHER PUBLICATIONS

U.S. Appl. No. 15/635,589, filed Jun. 28, 2017.
IBM, "List of IBM Patents or Patent Applications Treated as Related", Appendix P, filed herewith.

* cited by examiner

*Primary Examiner* — Izunna Okeke
(74) *Attorney, Agent, or Firm* — Alexander G. Jochym

(57) ABSTRACT

An approach using a computer, receives from a first computer, text generated by a user and identifies in the text generated by the user, confidential information registered in a dictionary that contains registered confidential information and substitute words corresponding to the registered confidential information. The approach includes retrieving, from the dictionary, substitute words corresponding to each identified registered confidential information and identifying, in the text generated by the user, potentially confidential words based on a text analysis of the text generated by the user. The approach includes sending to the first computer, a proposed protected text including the text generated by the user with each of the identified registered confidential information marked along with each of the retrieved substitute words to replace the identified confidential information, and each of the potentially confidential words marked along with each of one or more generated words to replace the potentially confidential words.

1 Claim, 5 Drawing Sheets

*test ~ 401

When I clicked on the search button of
WEX V11, build 1532, an NPE resulted.
Is this a bug?  ~ 402A

FIG. 4A

*test ~ 401 dog head
When I clicked on the search button of
Oze    9841    prize lot
WEX V11, build 1532, an NPE resulted.
car
Is this a bug?  ~ 402B

FIG. 4B

*test ~ 401

When I clicked on the *dog head* of *Oze*,
build *9841*, an *prize lot* resulted.
Is this a *car*?  ~ 402C

FIG. 4C

PROTECTING CONFIDENTIAL INFORMATION

BACKGROUND OF THE INVENTION

The present invention relates generally to the field of confidential information protection and more particularly to protecting confidential information when communicating using external networks and services.

There are a number of convenient, external web services for sharing information, team collaboration, and group communication. Some of these web services may provide a version control repository, source code management, and internet hosting services for coordinating work on computer files and tracking changes on files when multiple users are inputting to files. Other web services may provide cloud-based team collaboration tools where a team owner may invite specific individuals or identified groups of users to join a community, for example, through a specific provided URL or e-mail invitation. Some of the communities may be categorized by topics of discussion of interest to a group of users or team members. In some cases, web services provide public channels that allow team members to communicate without the use of e-mail or group messaging using a short messaging service (SMS). Some web services provide private channels allowing private conversations between smaller identified groups or team members. In various web services, a direct message group may be created by a user or originator and, in some web services, the direct message group can be converted into a private channel, for example, to discuss activities related to a specific work item or sub-project.

SUMMARY

Embodiments of the present invention disclose a method, a computer program product, and a system for one or more computer processors receiving from a first computer, text generated by a user wherein the text generated by the user is one of: text input on an external web service generated from a plug-in to a client program that is a browser on the first computer, an email from a plug-in to the client program that is one of an email program or an email application on the first computer, and a message from a plug-in to the client program that is one of a messaging program or a messaging application on the first computer. The method includes identifying in the text generated by the user, one or more confidential information registered in a dictionary, wherein the dictionary contains a plurality of registered confidential information and a plurality of substitute words corresponding to the plurality of registered confidential information. The method includes retrieving from the dictionary, one or more substitute words corresponding to each identified registered confidential information of the one or more confidential information registered in the dictionary. Additionally, the method includes identifying in the text generated by the user, whether one or more words are potentially confidential based, at least in part, on a text analysis of the text generated by the user and generating one or more words for each of the one or more potentially confidential words, wherein the one or more generated words are determined based, at least in part, on determining an edit distance is less than a threshold edit distance. The method includes determining for each of the one or more potentially confidential words with the edit distance less than the threshold edit distance, the registered confidential information associated with a shortest edit distance. Furthermore, the method includes retrieving from the dictionary, the one or more substitute words corresponding to the registered confidential information with the shortest edit distance. The method includes determining a category of the one or more substitute words corresponding to the registered confidential information associated with the shortest edit distance and retrieving a list of unused words in the category of the one or more words corresponding to the registered confidential information associated with the shortest edit distance. In addition, the method includes selecting one or more words from the list of unused words in the category of the one or more retrieved substitute words corresponding to the registered confidential information with the shortest edit distance based, at least in part, the text analysis identifying a highest topic index of the one or more words from the list of unused words in the category of the one or more retrieved substitute words corresponding to the registered confidential information associated with the shortest edit distance. The method includes sending to the first computer, a proposed protected text, wherein the proposed protected text includes the text generated by the user with each of the identified registered confidential information included with each of the one or more retrieved substitute words to replace the identified confidential information and each of the one or more potentially confidential words included with each of the one or more generated words to replace the one or more potentially confidential words. Furthermore, the method receiving from the first computer, at least one of: one of more edits to the proposed protected text input by the user and an indication of an approval by the user of the proposed protected text. Responsive to receiving, from the first computer, the one of more edits to the proposed protected text input by the user, the method includes performing the one or more edits to the proposed protected text input by the user and generating one or more substitute words for each of the one of more edits to the proposed protected text input by the user, wherein the one or more generated substitute words are determined based, at least in part, on determining an edit distance is less than a threshold edit distance. Responsive to receiving, from the first computer, the indication of the approval by the user of the proposed protected text, the method includes creating a user approved protected text, wherein the user approved protected text includes replacing each of the identified registered confidential information in the proposed protected text with the one or more retrieved substitute words corresponding to the identified registered confidential information of the one or more confidential information registered in the dictionary, replacing each of the one or more potentially confidential words in the proposed protected text with the one or more generated words to replace each of the one or more potentially confidential words, and replacing the additional registered confidential information indicated by the one or more edits to the proposed protected text input by the user with the one or more generated substitute words for each of the additional registered confidential information indicated by the one of more edits to the proposed protected text input by the user. The method includes sending the user approved protected text to the first computer and identifying each of the one or more potentially confidential words replaced in the user approved protected text as registered confidential information with the one or more generated words replacing each of the one or more potentially confidential words in the user approved protected text and each of the additional registered confidential information indicated by the one or more edits to the proposed protected text input by the user with the one or more generated substitute words for each of the additional registered confidential information indicated by one of more edits to the proposed protected text input the by the user. Furthermore, the method includes updating the dictionary to include each of the one or more potentially confidential words replaced in the user approved protected text as registered confidential information with the one or more generated words replacing each of the one or more potentially confidential words in the user approved protected text and each of the additional registered confidential information in the proposed protected text identified by the one of one of more edits as registered confidential information with the with the one or more generated substitute words replacing each of the additional registered confidential information in the user approved proposed protected text.

BRIEF DESCRIPTION OF THE DRAWINGS

FIG. 4A is an illustration of an example of a user input comment in an external web service, in accordance with an embodiment of the present invention.

FIG. 4B is an illustration of an example of a proposed protected comment sent to the computer of a user computer, in accordance with an embodiment of the present invention.

FIG. 4C is an illustration of an example of a user approved protected comment sent to an external web service, in accordance with an embodiment of the present invention.

DETAILED DESCRIPTION

Figure 1:
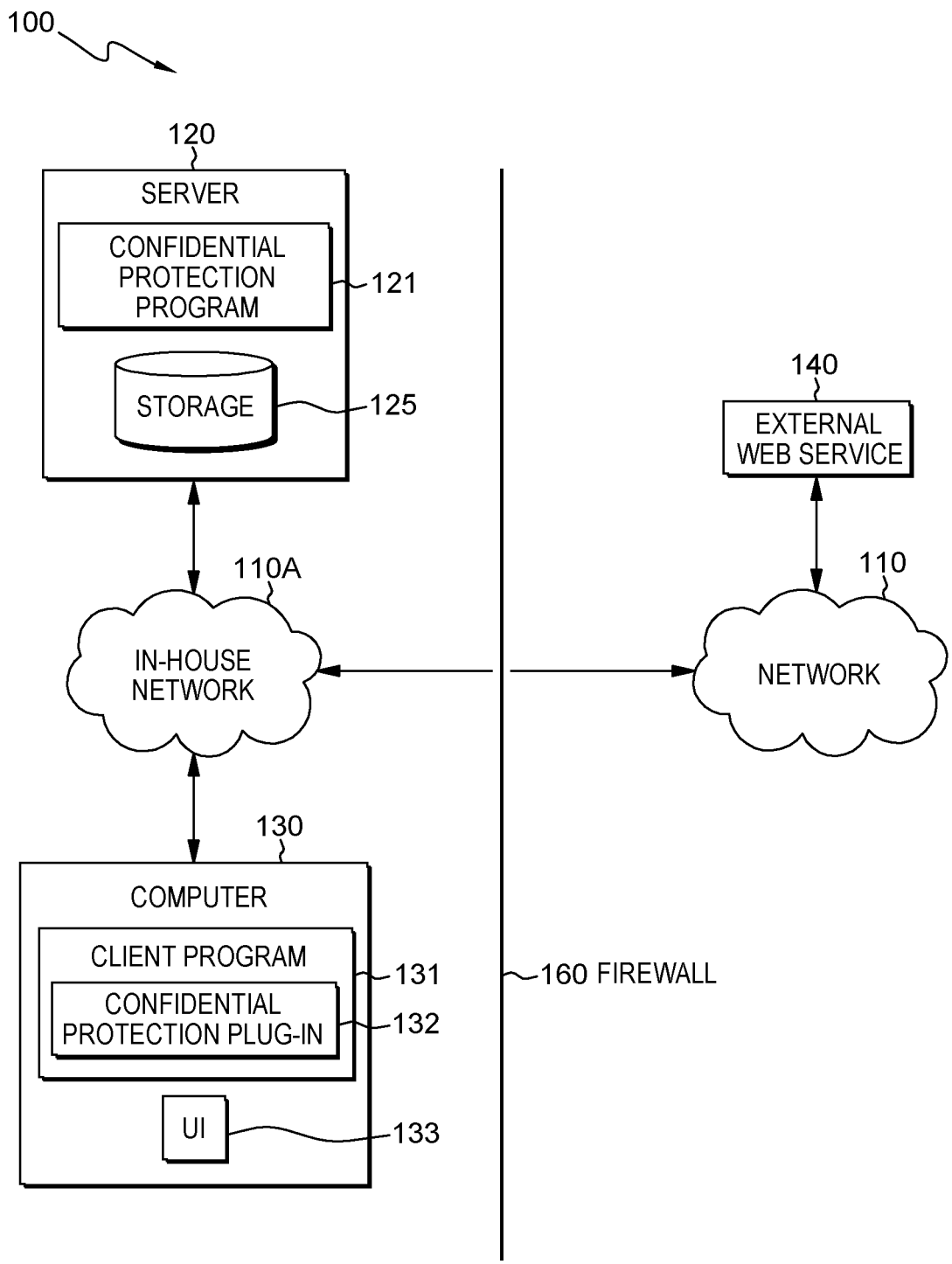
FIG. 1 is a functional block diagram illustrating a distributed data processing environment, in accordance with at least one embodiment of the present invention.

Embodiments of the present invention recognize while numerous external web services provide a convenient method for information sharing and team collaboration, the external web services do not provide adequate protection of confidential information. Embodiments of the present invention recognize that a method is needed to ensure protection of confidential information by a team or organization using an external web service for team communication. Embodiments of the present invention recognize that team members using an external web service may wish to discuss confidential information or may inadvertently include confidential information such as program dates, names, or proprietary computer code or routines in a discussion within an external web service. Embodiments of the present invention recognize that encryption of comments, post, messages, or the like in an external web service provides a solution to protecting confidential information; however, the comment, message, or post is unreadable to team members until decoding of the encryption is executed. Embodiments of the present invention recognize that team members may desire a method of protecting specific elements or words as confidential information within a comment or post by selectively substituting identified confidential information and associated words or dates that could potentially be confidential in nature while still maintaining a certain level of readability of the comment without decoding the comment. Additionally, embodiments of the present invention recognize that encryption of images, videos, and some other types of embedded images or attached files is not possible.

Embodiments of the present invention provides a user of a computer, either within a team or within an organization, with a program on a server of an in-house network or company intranet to identify and selectively replace confidential information and other potentially confidential information with other unassociated words (e.g., jargon), random numbers, or characters. For purposes of discussion of the present invention, the term "jargon" is used for the one or more words with a different meaning than the confidential or potentially confidential words the jargons replace. It is recognized that the one or more words may not technically be jargon, according to various known definitions of "jargon" (i.e., specific words or expressions used by a particular group or profession that are difficult for individuals outside the group to understand) but, for ease of discussion the one or more words replacing each identified confidential and each potentially confidential information hereinafter, will be called a "jargon". Embodiments of the present invention protect the unintended release or sharing of confidential information outside of the team or outside of the in-house or company network while still providing a certain level of readability of a comment by team members before decoding the comment protected by confidential protection program 121.

Embodiments of the present invention allow a user in an in-house network utilizing an external web service to automatically identify and protect information that may be potentially confidential using a program on an in-house server that analyzes comments, posts, and other user generated text entered on a computer by the user for communication via the external web service. Embodiments of the present invention encode or generate jargon to replace identified confidential and potentially confidential information and to decode or replace jargon with protected confidential information in user communications within an external web service. The method includes storing of generated jargon in a dictionary or file with the identified confidential information or potentially confidential information is to replace.

Embodiments of the present invention identify potentially confidential information and generate jargons for the potentially confidential information using the results of a text analysis of the comments, posts, or the like and a minimum threshold edit distance. Embodiments of the present invention based, at least in part, on the text analysis, identify a category of words to use for the selection of a jargon for potentially confidential information in the comments or posts in an external web service. Embodiments of the present invention utilize a threshold edit distance to determine a jargon category. Embodiments of the present invention generate a jargon from a same category as a jargon used to replace a registered confidential information that provides a minimum edit distance with respect the potentially confidential information in order to provide a degree of inherent readability of a protected comment for team members without decoding a protected comment.

Embodiments of the present invention allow a user of a client computer with a plug-in or program extension to a client program, such as a browser, that automatically intercepts, reserves, or holds a comment, post, or other user generated text input in an external web service and redirects the comment, post, or user generated text to a program on an in-house server. The program on the in-house server replaces and protects confidential and potentially confidential information in user generated comments, posts, and the like received from the client computer. Embodiments of the present invention utilize a plug-in, a program extension, or additional program code added to a client program, such as a browser on a computer of a user, and an in-house server-based program (e.g., confidential protection program 121) that is used in conjunction with an external web service to provide a comment, post, or the like with a user selected level of protection (e.g., selective protection or encryption). Embodiments of the present invention provide user approval or a user selection to edit confidential information replacements or changes to comment after receiving from the server-based program, a protected comment or post (e.g., includes replacements for confidential and potentially confidential information) prior to distribution in the external web service.

Embodiments of the present invention provide a client program that is an email or a messaging program or application on a client computer of the user with a program extension, a plug-in, or additional custom logic to capture, re-direct, and send emails and messages to the server-based program. The extension to the client program or email program can receive protected emails or messages from the server-based program for a user indication of user acceptance, desired editing, or a request for encryption of the comment that is returned to the server-based program.

Further, embodiments of the present invention improve the security of computer-assisted communications and reduce the risks of inadvertent disclosure of sensitive and/or confidential data by users utilizing a communication channel, such as an external web service, that is not secured by aspects of an in-house enterprise communication system. Embodiments of the present invention intercept such communications and modify the communication substituting intelligently determined jargon as opposed to encrypting a comment that prevents or impairs the ability of a user to interpret the communications. Additionally, embodiments of the present invention improve the security of computer-assisted communications in an external network or external web service by removing and storing files, images, and URL information in a secure in-house storage device while replacing the files, images, and URLs with the location in which the removed files, images, URLs are securely stored. As such, the security of electronic communications is seen to be improved in at least these aspects.

FIG. 1 is a functional block diagram illustrating a distributed data processing environment, generally designated 100, in accordance with at least two embodiments of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted in FIG. 1, distributed data processing environment 100 includes server 120, computer 130, external web service 140, firewall 160; all interconnected over network 110 and/or in-house network 110A. In-house network 110A is an in-house or company network such as a company intranet connecting computer 130, server 120, and other in-house computing devices (not depicted) and connecting to network 110. In various embodiments, in-house network 110A provides protected electronic communication and shared computing resources such as computing systems, programs and databases for various computing devices, such as computer 130, for employees of a company, government, or other organization that are allowed access to in-house network 110A by company network administrators. In-house network 110A and network 110 can include, for example, wireless local area network (WLAN), a telecommunications network, a local area network (LAN), a virtual LAN (VLAN), a wide area network (WAN), or a combination of the these, and can include wired or wireless connections. Network 110 and in-house network 110A can include one or more wireless networks and/or wired networks that are capable of receiving and transmitting data including wireless data such as sensor data, radio waves, infrared signals, electrical signals, and other similar signals for data transmission. In general, network 110 and in-house network 110A can be any combination of connections and protocols that will support communications between server 120, computer 130 and external web service 140 along with other computing devices (not shown) within distributed data processing environment 100.

Server 120 may be a server computer, a management server, a web server, a mainframe computer, or any other electronic device or computing system capable of receiving, sending and processing data. In various embodiments, server 120 represents a computing system utilizing clustered computers and components (e.g., database server computers, application servers, etc.) that act as a single pool of seamless resources such as used in a cloud-computing environment when accessed within distributed data processing environment 100. In another embodiment, server 120 can be a laptop computer, a tablet computer, a netbook computer, a notebook computer, a mobile computing device, a personal computer (PC), a desktop computer, a personal digital assistant (PDA), a smart phone or any programmable electronic device capable of communicating with each other and other associated electronic devices via in-house network 110A or network 110. In various embodiments, as depicted in FIG. 1, server 120 is a server including confidential protection program 121 and storage 125. Server 120 with confidential protection program 121 is capable of sending and receiving data from computer 130 and other client computing devices (not depicted in FIG. 1). Server 120 may include internal and external hardware components, as depicted and described in further detail with respect to FIG. 5.

Confidential protection program 121 resides in server 120. In various embodiments, confidential protection program 121 is a computer program capable of receiving a comment, post, or the like redirected from computer 130 prior to communication via external web service 140. In an embodiment, confidential protection program 121 is one of a computer module, an application, a system, or an apparatus capable of receiving a comment, post, or the like redirected from computer 130 prior to communication via external web service 140. Confidential protection program 121 performs one or more substitutions of identified confidential information in the comment or post and identifies potential confidential information in the comment for substitution using a text analysis engine. The comment, post, or message (e.g. a user generated text) may be input by a user to external web service 140 using confidential protection plug-in 132 on computer 130. In various embodiments, upon receiving from computer 130 an intercepted comment or user generated text prior to distribution via external web service 140, confidential protection program 121 performs a text analysis on the comment and generates a jargon to replace each word or words identified as confidential information and each word or phrases of potentially confidential information such as target words. A jargon, as used in the present invention, may be one or more words generated or retrieved by confidential protection program 121 to replace identified confidential or potentially confidential information.

Confidential protection program 121 selectively replaces (e.g., encodes) confidential and potentially confidential information in a comment in external web service 140 based at least in part, on an edit distance. In various embodiments, confidential protection program 121 uses a jargon dictionary, which may be used to both encode (e.g., replace confidential information with jargons) and decode protected confidential information in user generated text such as a comment to be shared within external web service 140. A jargon dictionary can be a file or a database storing previously determined jargons with the identified confidential information or potentially confidential information the jargon replaces. In various embodiments, a jargon dictionary includes a category dictionary identifying the category of jargon (e.g., a jargon of "dolphin" is from a category of "toothed whales") and words within a category not yet used as jargon (e.g., category candidate list). In various embodiments, confidential protection program 121 retrieves from a jargon dictionary in storage 125 a jargon corresponding to each identified confidential information in a user generated text.

In various embodiments, confidential protection program 121 identifies and protects other potentially confidential information such as uniform resource locators (URLs), attached files, embedded images, and numerical value or date strings in a comment, post, or user generated text. In various embodiments, confidential protection program 121 includes computer code or routines capable of performing URL shortening and encryption. In various embodiments, confidential protection program 121 replaces and stores shortened URLs with original URL, detaches files and stores de-attached files, and provides encryption of comments upon user request. In various embodiments, confidential protection program 121 updates, retrieves, and stores generated jargons with corresponding identified confidential information in jargon dictionary. In various embodiments, confidential protection program 121 sends and receives protected and unprotected comments from confidential protection plug-in 132 of client program 131 of computer 130 prior to distribution in external web service 140. In various embodiments, confidential protection program 121 retrieves and stores data such as the results of comment text analysis and user approved protected comments in storage 125. In an embodiment, confidential protection program 121 sends and receives user generated text such as emails, messages including a short messaging service (SMS) messages, or other electronic communication sent in email service, mobile communication service, or other known electronic communication system for protection of confidential information. In various embodiments, confidential protection program 121 receives from an email program, messaging application (e.g., SMS) or other client program 131 with additional code or custom logic in the client (e.g., confidential protection plug-in 132) capable of intercepting and redirecting the user generated text (e.g., email or SMS) to confidential protection program 121 on server 120. In various embodiments, confidential protection program 121 replaces confidential and potential confidential information using one or more jargon generated based, at least in part, on a minimum threshold edit distance determination. Additionally, in some embodiments, confidential protection program 121 removes, stores, and replaces potentially confidential images, files and URLs with the locations for the stored files, images, and original URLs received in a user generated text such as an email, messages, or SMS from computer 130.

In various embodiments, confidential protection program 121 is capable of both encoding/protecting confidential information and decoding/re-adding removed confidential information in comments, posts, or user generated text. In various embodiments, confidential protection program 121 receives via external web service 140, a messaging system, or an email system, an unprotected or a protected comment, a protected email or a protected message from another team member or user and encodes or decodes, respectively, the unprotected comment or the protected comment, email, or message using a jargon dictionary. In an embodiment, URL shortening service, text analysis engine, category dictionary, and storage 125 with a file repository, and reside in one or more other computing devices (not depicted in FIG. 1) in distributed data processing environment 100 that is accessible to server 120 via in-house network 110A.

In various embodiments, storage 125 resides in server 120. Storage 125 receives and sends data from confidential protection program 121 and computer 130. The communicated data may include, for example, text analysis results, updates to registered confidential information, generated jargon and corresponding the confidential information (e.g., to replace jargon and vice versa), URLs (e.g., full length and shortened), de-attached files, and the like. In various embodiments, storage 125 includes jargon and category dictionaries. In various embodiments, storage 125 is accessed to store and retrieve data, such as text analysis results, detached files, jargons, new confidential information with corresponding jargons, and stored URLs in one or more files or databases. In an embodiment, storage 125 is not resident in server 120 but resides in another location on one or more computers (not depicted in FIG. 1) in in-house network 110A that are accessible to confidential protection program 121.

Computer 130 can be a laptop computer, a smart phone, a laptop computer, a tablet computer, a desktop computer, or any programmable electronic device capable of communicating with various components and devices within distributed data processing environment 100, via network 110 and in-house network 110A. In general, computer 130 represents any programmable electronic device or combination of programmable electronic devices capable of executing machine-readable program instructions and communicating with other computing devices within distributed data processing environment 100 via a network, such as in-house network 110A and/or network 110. In various embodiments, computer 130 includes client program 131, confidential protection plug-in 132, and user interface (UI) 133. In various embodiments, computer 130 receives user input or a comment for posting to external web service 140 via confidential protection plug-in 132. In response to receiving from the user an indication to send a comment via external web service 140, confidential protection plug-in 132 intercepts and sends the user comment to server 120 for identification and protection of confidential and potentially confidential information. In various embodiments, computer 130 receives either a protected (e.g., an encoded comment) or a decoded comment from confidential protection program 121. In an embodiment, computer 130 receives user input to create a user generated text such as an email sent to confidential protection program 121 for protection of confidential information. In various embodiments, computer 130 receives protected comments and protected user generated text, from confidential protection program 121, and upon user approval or input, sends the protected comments or protected user generated text to external web service 140 or another external location in network 110.

For the purposes of the present invention, user generated text includes but, is not limited to comments, blogs, posts, or the like in confidential protection plug-in 132 of client program 131 (e.g., a browser) via an external web service such as external web service 140 and emails, messages including SMS, and the like in confidential protection plug-in 132 of client program 131 that is an email program, SMS application, or the like.

While depicted as a single computing device, computer 130 may be one of many client devices or client computers (not depicted) communicating with each other, with server 120, and/or with external web service 140 in distributed data processing environment 100. Computer 130 may include internal and external hardware components, as depicted and described in further detail with respect to FIG. 5.

Client program 131 is a software application or program in computer 130. In various embodiments, client program 131 is an external web service client (e.g., a browser, web browser, or native client) for retrieving, presenting and traversing information resources identified by a uniform resource identifier or locator (URI/URL) that may be a web page, image, video or other piece of content on the World Wide Web (e.g., the Internet). In various embodiments, client program 131 accesses information provided by web servers in a private network, such as in-house network 110A. In some embodiments, client program 131 is one of an email or a messaging program or application in computer 130.

Confidential protection plug-in 132 is a program, module, application, additional program code, or custom logic providing an extension to client program 131. In various embodiments, confidential protection plug-in 132 is a plug-in, a browser extension, a browser bookmark, or plug-in to known browser applications (e.g., client program 131) that re-directs comments, blogs, posts, and the like in external web service 140 to confidential protection program 121 prior to sending or release to external web service 140 via in-house network 110A and/or network 110. In some embodiments, confidential protection plug-in 132 automatically activates in response to client program 131 executing. In other embodiments, confidential protection plug-in 132 activates in response to a user activating a communication channel that utilizes external web service 140. In various embodiments, confidential protection plug-in 132 re-directs user input such as a comment or post for distribution via external web service 140 to server 120. Confidential protection plug-in 132 sends a completed comment, post, or other user generated input to confidential protection program 121 in response to the user selecting "send."

In some embodiments, confidential protection plug-in 132 is a program extension, a plug-in, additional program code, or custom logic added to client program 131 when client program 131 is an email application, an email program, a messaging application (e.g., SMS application), messaging program, or other communication program between various computing devices in distributed data processing environment 100.

In various embodiments, confidential protection plug-in 132 receives a user selection of a desired level of protection for the comment. In various embodiments, confidential protection plug-in 132 allows a user selection to provide selective protection of confidential information or full protection or encryption of information in the comment and sends the level of user selected protection with the comment to confidential protection program 121. In various embodiments, confidential protection plug-in 132 receives a user selection of the level of protection for a comment via a user input on UI 133 (e.g., in a pop-up menu, a button, an icon, or the like) that indicates a comment or post requires full encryption or selective protection of confidential information. In various embodiments, confidential protection plug-in 132 receives decoded comments from confidential protection program 121 (e.g., includes original confidential information).

UI 133 provides an interface for a user of computer 130 to confidential protection plug-in 132, server 120, external web service 140, and other computing devices in distributed data processing environment 100 (not shown). In various embodiments, UI 133 may be a two-sided remote input device, a two-sided touch screen, a graphical user interface (GUI) or a web user interface (WUI). In various embodiments, UI 133 can receive user input such as instructions for operation, and include the information (such as graphics, text, and the like) communicated to confidential protection plug-in 132 and to confidential protection program 121 on server 120. In another embodiment, UI 133 may also be mobile application software that provides an interface between the users of computer 130 and confidential protection program 121 or external web service 140.

External web service 140 is a service offered by a software application or computing system to enable two or more electronic devices to communicate with each other via the World Wide Web (e.g., the Internet). In various embodiments, external web service 140 is a known software system designed to interoperable machine-to-machine interactions over an external network such as network 110. In various embodiments, external web service 140 is a cloud-based team collaboration tool or a version control repository with access control and collaboration features such as bug tracking, task management, and wikis for projects. External web service 140 resides in network 110 (e.g., outside of firewall 160 and/or outside of in-house network 110A).

Firewall 160 is a network security system that monitors, and controls incoming and outgoing network traffic based on predetermined security rules. Firewall 160 may be created by any known method that establishes a barrier between a trusted, secure internal network, such as a company intranet (e.g., in-house network 110A), and another outside network, such as the Internet (e.g., network 110). In various embodiments, firewall 160 is a network firewall, a host-based firewall, or other known type of firewall providing protection and security to in-house network 110A.

Figure 2:
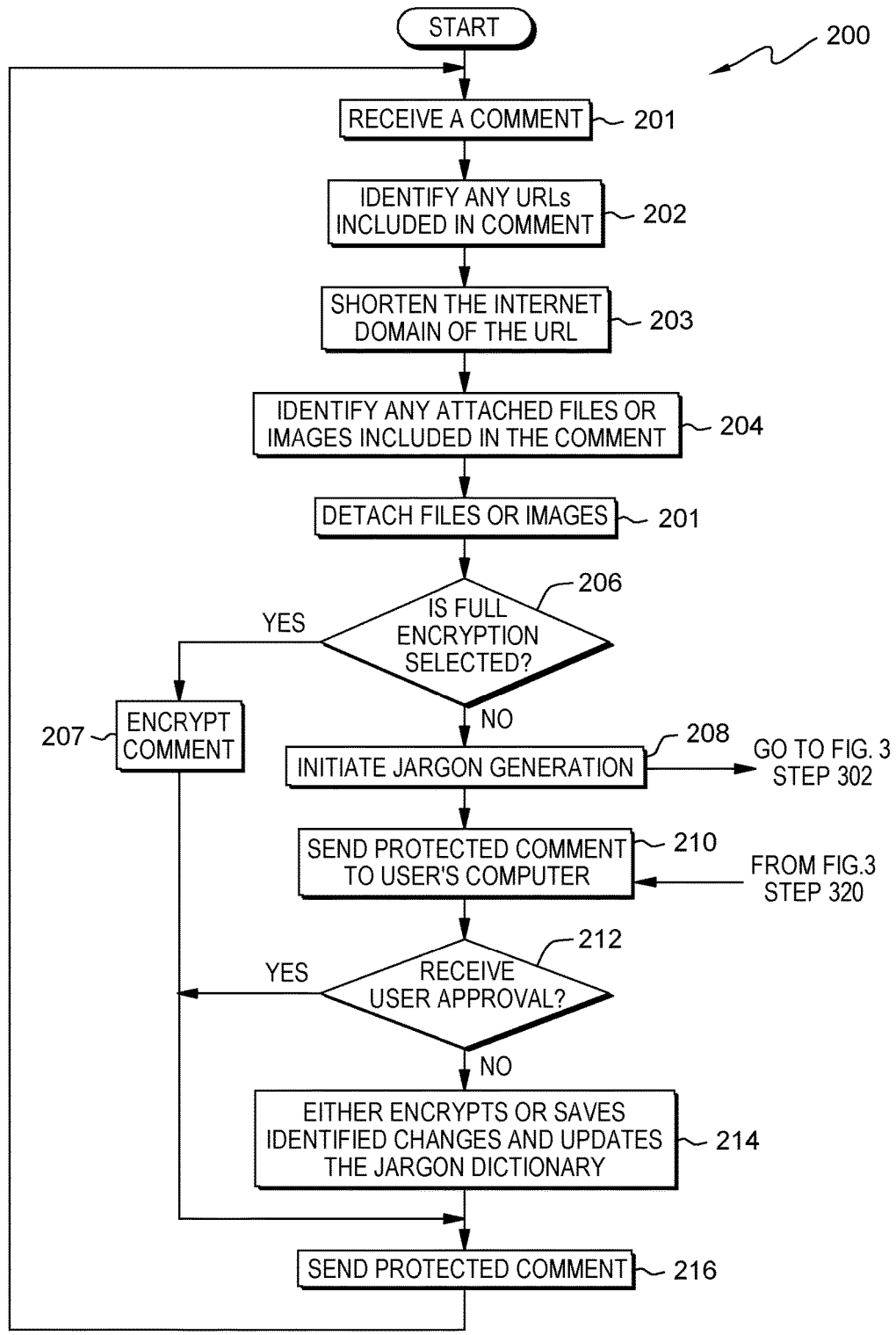
FIG. 2 is a flowchart depicting operational steps of a method to protect confidential information in a comment in an external web service, in accordance with an embodiment of the present invention.

FIG. 2 is flowchart 200 depicting operational steps of a method to protect confidential information in a comment in an external web service, in accordance with an embodiment of the present invention. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s).

In various embodiments, confidential protection program 121 receives a comment (201) targeted for release via external web service 140. In various embodiments, confidential protection program 121 receives, from computer 130, a comment, a remark, a post, or the like to be sent via an external network (e.g., network 110) using a non-protected web service, such as external web service 140, where confidential information may be accessed by unauthorized computers, systems, or individuals. In various embodiments, confidential protection program 121 receives from computer 130 a comment, which may be a comment, a post, a remark, a message, or the like in external web service 140 such as a chat service (e.g., providing channels or topics for groups), a blog, a discussion forum in a rich site summary (RRS) news feed, or the like. Confidential protection program 121 receives from computer 130 comments or remarks, for example, in a channel of a chat service, a blog, a private group communication in external web service 140, or team communication within a created community in external web service 140. In various embodiments, confidential protection plug-in 132 sends user generated text such as comments, data, and the like to confidential protection program 121 upon completion of user entry of the user generated text and prior to distribution to external web service 140 or network 110. In various embodiments, confidential protection program 121 receives a redirected comment from user input in external web service 140 using confidential protection plug-in 132 in client program 131. For example, a user on computer 130 using confidential protection plug-in 132 types in a comment in a channel of external web service 140 on source code quality used by his or her team and hits "send." In response, confidential protection plug-in 132 in client program 131 automatically intercepts and sends the comment to confidential protection program 121 in server 120 prior to sending the comment to external web service 140.

In some embodiments, confidential protection program 121 receives emails from confidential protection plug-in 132. In this embodiment, confidential protection plug-in 132 is a program extension, a plug-in, additional program code, or custom logic added to client program 131 when client program 131 is an email program or application in computer 130. The program extension or additional programming code (e.g., confidential protection plug-in 132) in client program 131 automatically intercepts and redirects all emails with non-in-house email addresses to confidential protection program 121 prior to sending to a user input destination.

Similarly, in an embodiment, confidential protection program 121 receives messages from confidential protection plug-in 132. In this embodiment, confidential protection plug-in 132 is a program extension, additional program code, custom logic, or the like to client program 131 when client program 131 is a messaging program or application (e.g., a SMS application) on computer 130. Confidential protection program 121 receives messages that may require protection of potentially confidential information prior to release through an external, unprotected network (e.g., network 110).

In one embodiment, confidential protection program 121 receives all user generated text such as comments, messages, emails, and the like from computer 130 (both for distribution to an external network address or an address within in-house network 110A).

Confidential protection program 121 identifies any URLs included in the comment (202). Using known methods of URL detection, for example, during text analysis identifying text elements or words starting "http://www." as a URL, confidential protection program 121 identifies any URLs present.

Confidential protection program 121 shortens the internet domain of the URL (203). In various embodiments, confidential protection program 121 treats a URL as sensitive or potentially confidential information. For example, a URL included in a comment by the user may be for an in-house website location, which may contain confidential information or by the location identifier, inadvertently provide sensitive information. In various embodiments, confidential protection program 121 includes a URL shortening service. The URL shortening service may be any application, program, or URL shortening algorithm known to one skilled in the art. In an embodiment, confidential protection program 121 sends the URL to a URL shortening service in storage 125 or in another location within distributed data processing environment 100. Confidential protection program 121 receives a shortened URL from a URL shortening service to include in the comment or user generated text. In various embodiments, confidential protection program 121 stores the original URL with the shortened URL in storage 125. In an embodiment, confidential protection program 121 identifies the shortened URL, for example, by highlights, color, hidden characters, or the like to prevent the identification of the shortened URL as confidential or potentially confidential information.

Confidential protection program 121 identifies any attached files or images in a comment (204). In various embodiments, confidential protection program 121 determines if a file is attached to the comment or user generated text. The file, which may be a data file, a presentation file, a document, an image attached, or embedded in the comment or user generated text, or the like, is treated as information that may be confidential and as such, is protected.

Confidential protection program 121 detaches files or images (205). In various embodiments, confidential protection program 121 detaches the identified files or images and stores the detached files or images in storage 125. In various embodiments, confidential protection program 121 replaces the files or images in the comment with the location of the file or files in storage 125. In an embodiment, confidential protection program 121 stores the detached file in another database or storage location in server 120 and replaces the detached file with the storage location. In various embodiments, confidential protection program 121 identifies the location of the replaced file, for example, by the use of highlights, hidden characters, or the like to prevent identification of the file location.

Confidential protection program 121 determines whether full encryption is selected (decision 206). In various embodiments, confidential protection plug-in 132 includes an icon, a button, a pop-up menu, a drill-down menu, or the like the user may use to select "full encryption" to provide complete protection of a comment in response to typing the comment or upon selecting "send." In various embodiments, the user selection of full encryption is included with the comment or user generated text sent from confidential protection plug-in 132 to confidential protection program 121.

In response to determining the user selected full encryption (yes branch, decision 206) in confidential protection plug-in 132, confidential protection program 121 encrypts the comment (207). Using known encryption algorithms, confidential protection program 121 provides complete protection of confidential information in the comment by encrypting the comment and stores the original comment (e.g., unencrypted user generated text or comment in storage 125). Confidential protection program 121 sends the encrypted (e.g., protected comment) to computer 130 via confidential protection plug-in 132 (216) for delivery to addressed destination and then, confidential protection program 121 returns to step 201 to receive another comment.

In an embodiment, a program extension, a plug-in, or a module such as confidential protection plug-in 132 in client program 131, when client program 131 is an email program or a messaging service, includes a selection of "full encryption" by a user prior to sending the email or message to confidential protection program 121 for protection of registered confidential information and other potentially confidential information. In some embodiments, confidential protection program 121 identifies a user selection of "full encryption" in received emails or messages from computer 130 and encrypts the email.

Responsive to determining that full encryption is not selected (no branch, decision 206), confidential protection program 121 initiates jargon generation (208) for registered confidential words and identified target words that may be confidential or contain confidential information.

Figure 3:
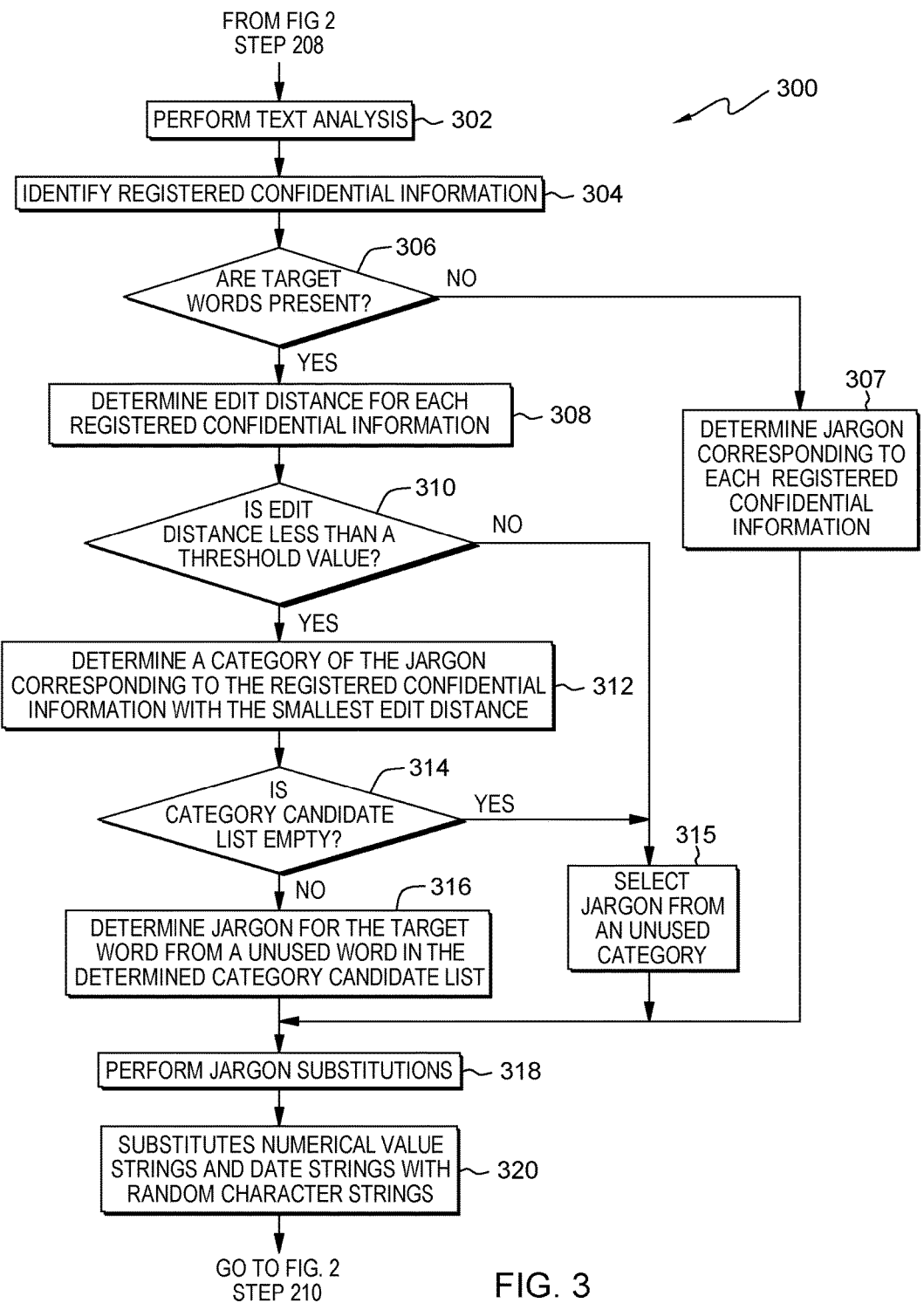
FIG. 3 is a flowchart depicting operational steps of a method to generate jargon as a part of a method to protect confidential information in a comment in an external web service, in accordance with an embodiment of the present invention.

FIG. 3 is flowchart 300 depicting operational steps of a method to generate jargon as a part of a method to protect confidential information in a comment in an external web service, in accordance with an embodiment of the present invention. The steps of jargon generation as performed by confidential protection program 121 are discussed in detail with respect to FIG. 3. Responsive to initiating jargon generation (208) of FIG. 2, confidential protection program 121 performs text analysis (302) on the comment.

In various embodiments, confidential protection program 121 performs text analysis on a comment or user generated text using natural language processing, text analysis and text mining techniques. In various embodiments, confidential protection program 121 uses the results of a text analysis of user generated text to detect confidential and potentially confidential information. In various embodiments, confidential protection program 121 performs text analysis on comments to be sent or distributed in a channel or a topic discussion area of external web service 140, such as used by a team, in a community, in a blog, or the like. In some embodiments, confidential protection program 121 provides text analysis on user generated text such as emails, messages, documents, files, presentations, and the like for distribution in an external network such as network 110.

In various embodiments, confidential protection program 121 uses known text analysis methods and text or data mining techniques including but, not limited to word matching, word frequency, part-of-speech analysis, indexing, concept analysis (e.g., concept dictionary), facet analysis, and the like. For example, confidential protection program 121 utilizes facet analysis (e.g., detects deviation of appearances of words in all comments or analyzed user generated text), and trend analysis (e.g., detects deviation of appearances of words in all comments and determines chronological deviation) along the use of concept analysis (e.g., creates or uses word categories and associated category word lists). In various embodiments, confidential protection program 121 performs text analysis including computation of deviation (correlation) of word appearance frequency, chronologically observed tendency of words or topic analysis, text categorization using machine learning algorithms, part-of-speech analysis, facet analysis, and the like. Text analysis by confidential protection program 121 may include the use of knowledge-based algorithms and systems along with the retrieval and review of previous text analysis of user generated text such as comments sent within the team (e.g. retrieved from storage 125). In various embodiments, confidential protection program 121 stores the text analysis results, such as resulting indices, in storage 125 on server 120. In an embodiment, a confidential protection program 121 residing on computer 130 accessing a text analysis function or program also resident on computer 130 stores the resulting indices in persistent storage 508 or memory 506 in computer 130.

Confidential protection program 121 identifies any registered confidential information (304) in the comment (e.g., user generated text). In various embodiments, confidential protection program 121 determines if any registered confidential information is present in each received comment or user generated text. For example, confidential protection program 121 identifies registered confidential information using known word matching techniques and a jargon dictionary that includes the confidential information registered by members of a team. In various embodiments, confidential protection program 121 performs an identification of registered confidential information during text analysis and marks each registered confidential information (e.g., by highlighting, symbols, hidden characters, or the like) so that the registered confidential information is identifiable in later steps.

Confidential protection program 121 determines whether target words are present (decision 306) in the comment or user generated text. In various embodiments, based, at least in part, on the text analysis of the comment, confidential protection program 121 identifies unknown words and other potentially confidential words as target words for possible replacement (e.g., using jargons). For example, confidential protection program 121 identifies target words that may be compound words or one or adjacent, related words, based in part, on the text analysis. For example, confidential protection program 121 identifies "execute button" as target words when "search button" is included in a jargon dictionary as registered confidential information (e.g., a portion of registered confidential information or "button" from "search button" is present in "execute button").

In various embodiments, confidential protection program 121 using part-of-speech analysis determines that proper nouns and unknown words should be evaluated as target words, and that verbs may optionally be target words. In various embodiments, confidential protection program 121 determines whether verbs are target words based, at least in part, on complicated logic comparing verb frequency in the user generated text or comment with the verb use in the general text corpus (e.g., the retrieved team comments and/or team user generated text from storage 125). In various embodiments, confidential protection program 121 receives an identification of verbs as registered confidential information. For example, one or more users in a team may register the verb "release" as a confidential word or confidential information as "release" may pertain to sensitive information on a system or software release into the marketplace.

In another example, confidential protection program 121 utilizes facet analysis and/or trend analysis for an evaluation of a proper noun as target words for replacement. Upon retrieval of stored user team generated text or comments in the general team text corpus from storage 125, if confidential protection program 121 determines that a proper noun is present in most analyzed user generated texts or comments by the team then, the proper noun may be, for example, a company name. In this example, confidential protection program 121 determines that a very common (e.g., used in most all communications), and therefore, the probability that the proper noun is confidential is low. In one embodiment, confidential protection program 121 highlights or includes a pop-screen with the first instance of a commonly used proper noun and queries the user to verify non-confidentiality of the commonly used proper noun. Conversely, confidential protection program 121 may determine that a proper noun with medium frequency is a target word that should be protected (e.g., replaced by one or more jargon).

Responsive to determining that target words are not present (no branch, decision 306), confidential protection program 121 determines a jargon corresponding to each identified registered confidential information (307) in the comment (e.g., user generated text). In various embodiments, confidential protection program 121 uses a jargon dictionary (e.g., specific to the team or organization) to extract or determine a jargon corresponding to each identified registered confidential information. For example, confidential protection program 121 retrieves from a jargon dictionary, the jargon, "car" corresponding to the identified registered confidential information "bug" from the jargon dictionary for the team of the user as depicted in FIG. 4B.

Confidential protection program 121 performs jargon substitution (318) of registered confidential information and target words in a comment. Using the retrieved jargon corresponding to each identified registered confidential information and the jargons generated for each target word (e.g., each potentially confidential information identified by the text analysis), confidential protection program 121 replaces each identified registered confidential information with a corresponding retrieved jargon and replaces each target word or words with a generated jargon for the target word. In various embodiments, confidential protection program 121 protects confidential and potentially confidential information (e.g., target words) in a comment or a user generated text by substituting registered confidential information and target words with jargons prior to entry into an unprotected external network (e.g., network 110) or external web service 140. In various embodiments, confidential protection program 121 marks the jargons replacing the registered confidential information and target words (e.g., by highlighting, italics, hidden characters, etc.) such that upon display to the user, the jargons are understood as replacements for confidential information.

Confidential protection program 121 substitutes numerical value strings and date strings with random character strings (320) in the comment. Based at least in part on the performed text analysis (e.g., part-or-speech analysis or character/number matching techniques), confidential protection program 121 identifies numerical value strings (e.g., a series of numbers) and date strings as potentially confidential information. In response to identifying numerical value or data strings, confidential protection program 121 generates random character strings (e.g., using known random character and/or random number generation algorithms). In various embodiments, confidential protection program 121 replaces the numerical value strings and date strings with random character strings to insure protection of potentially confidential information in the comment or user generated text and stores random character strings with the original data or numerical value strings and date strings the random characters replace. In an embodiment, confidential protection program 121 marks the random character strings (e.g., with highlights, hidden characters, etc.) Confidential protection program 121 returns to FIG. 2, to send the protected comment or user generated text to confidential protection plug-in 132 in client program 131 (210).

Responsive to determining that target words are present in the comment (yes branch, decision 306), confidential protection program 121 determines an edit distance (308) for each target word. In various embodiments, confidential protection client program 121 determines an edit distance between a target word (e.g., a target word or one or more related target words or phrases such as "product release date") and each identified registered confidential information. In various embodiments, confidential protection program 121 computes edit distances for a target word and each registered confidential information to determine the registered confidential information providing the minimum or smallest edit distance for each target word(s). As known to one skilled in the art, any one of a number of known methods may determine an edit distance. In various embodiments, confidential protection program 121 applies any one of the known methodologies to determine an edit distance.

In one embodiment, confidential protection program 121 uses a count of character insertions, removals, and modifications between a target word and each identified registered confidential information in the user generated text to determine an edit distance. For example, to determine a jargon for target word "WEX V12," a compound target word that includes a portion of registered confidential information "WEX V11." The target word "WEX V11" has an edit distance of 1 based, at least in part, the comparisons of the modifications of "WEX V11" as compared to "WEX V12" where the single digit "2" is modified from "WEX V11" when compared to "WEX V12" thus, providing an edit distance of 1 for "WEX V12" with respect to "WEX V12".

Confidential protection program 121 determines whether the edit distance is less a threshold edit distance (decision 310). Confidential protection program 121 includes a pre-set or pre-determined minimum edit distance that is a threshold edit distance for determining how a jargon is generated for a target word. The use of a pre-set minimum threshold distance reduces the determination of a jargon from a same jargon category for unrelated target words (e.g., to improve team user understanding even without decoding of protected information). For example, a threshold edit distance is 75% of the length a target word. Continuing with the example above, the determined target word, "WEX V12" has a length of 7. Therefore, a minimum or threshold edit distance, in this example, would be 5 (e.g., the nearest integer to 5.25, which is 75% of 7). Therefore, "WEX V12" with an edit distance of 1 with "WEX V11" is less than the threshold edit distance.

Responsive to determining that the edit distance is greater than the threshold distance (no branch, decision 310), confidential protection program 121 selects a jargon from an unused category (315) in a category dictionary. In various embodiments, confidential protection program 121 randomly selects an unused category for the jargon and then, randomly selects one or more words from the category candidate list in the unused category as a jargon to replace the target word.

Responsive to determining that the edit distance is less than the threshold distance (yes branch, decision 310), confidential protection program 121 determines a category of the jargon of the registered confidential information with the shortest edit distance (312) in the comment. In the example above, "WEX V11" with an edit distance of 1 is determined as the registered confidential information with smallest or shortest edit distance with respect to "WEX V12" and therefore, the category of the jargon corresponding to "WEX V11" is used for jargon generation. Upon retrieving the jargon "Oze" for "WEX V11" from the jargon dictionary and based, at least in part, on a category dictionary, confidential protection program 121 determines the category of "famous Japanese highlands" (e.g., Oze, Nasu, Appi, Amagi, and the like) for the jargon "Oze" corresponding to registered confidential information "WEX V11."

In an embodiment, confidential protection program 121 determines if a portion of a registered confidential information matches a portion of a target word. Responsive to determining that a portion of a target word matches a portion of a registered confidential information, confidential protection program 121 uses the portion of the jargon corresponding to the matching portion of the registered confidential information and selects a jargon from the same category as the jargon for the non-matching portion registered confidential information. For example, confidential protection program 121 identifies "execute button" and "cancel button" as target words that include a portion of registered confidential information "search button" (e.g., using a team jargon dictionary). Based on the retrieved jargon "dog head," the corresponding to "search button" (e.g., from jargon dictionary), the portion of the jargon associated with "button" in "search button" is "head." Confidential protection program 121 may provide a similar jargon from a category of animal heads. For example, confidential protection program 121 may provide "cat head" as jargon for "execute button" and "rabbit head" for jargon for "cancel button."

Confidential protection program 121 determines whether the category candidate list is empty (decision 314). Based, at least in part, on a retrieved category candidate list (e.g., from a category dictionary), confidential protection program 121 determines that the category candidate list is empty (yes branch, decision 314), confidential protection program 121 selects a jargon from an unused category (315) in the category dictionary. In various embodiments, confidential protection program 121 randomly selects an unused category and then, randomly selects one or more words from a category candidate list in the unused category as a jargon to replace the target word.

Responsive the determining that the category list is not empty (no branch, decision 314), confidential protection program 121 determines a jargon for the target word from an unused word in the category candidate list (316). Confidential protection program 121 selects a word or associated words from the unused words in the category word list as a jargon replacing the target word, based at least in part, on the text analysis results (step 302). In various embodiments, confidential protection program 121 sorts the unused words in the category candidate list using a topic index determined in the text analysis of comments. In an embodiment, confidential protection program 121 retrieves the results of text analysis of comments by the team in external web service 140 to extract a topic index. In various embodiments, confidential protection program 121 sorts the unused words in order of the highest to lowest topic index. In various embodiments, confidential protection program 121 selects the unused word with the highest topic index for jargon to replace the target word.

For example, continuing with the above example, as discussed, confidential protection program 121 determines registered confidential information "WEX V11" provides the shortest edit distance and extracts from the team shared jargon dictionary the corresponding jargon "Oze." Oze is from a category of famous Japanese highlands. Confidential protection program 121 retrieves from the category dictionary a category candidate list of unused words in the category "famous Japanese highlands" including "Nasu, Appi, and Amagi." Based, at least in part, on a higher topic index for "Nasu," confidential protection program 121 selects "Nasu" as the jargon for "WEX V12."

In an embodiment, confidential protection program 121 sends several of the unused words with high topic indexes to confidential protection plug-in 132 on computer 130 for presentation to the user for a user selection of the jargon from the provided potential jargons. In this embodiment, confidential protection program 121 receives from computer 130, the user selection of the jargon for the target word from the presented unused words. In one embodiment, confidential protection program 121 receives from computer 130 a user selection of another word (e.g., user inputs a different word desired for the jargon).

Confidential protection program 121 performs jargon substitutions (318) in the comment or user generated text. As previously discussed, confidential protection program 121 replaces registered confidential information and identified target words with retrieved jargons and generated jargons, substitutes numerical value strings, and date strings with random character strings (320) in the comment or user generated text.

Returning to FIG. 2, confidential protection program 121 sends the protected comment to computer 130 of the user (210). In various embodiments, confidential protection program 121 sends the comment or user generated text after replacement of the various registered confidential information and the target words to confidential protection plug-in 132 on computer 130 for display to the user on UI 133. In various embodiments, confidential protection plug-in 132 in client program 131 receives the protected comment with the replacement of registered confidential information, target words, attached files, embedded images, original URLs, numerical value and date strings, and displays the protected comment to the user on UI 133.

Confidential protection program 121 determines whether user approval is received (decision 212) from computer 130 based on a user approval of the protected comment or user generated text received from confidential protection plug-in 132. Using confidential protection plug-in 132 on computer 130, the user reviews the protected comment or protected user generated text on UI 133 received from confidential protection program 121 to determine if the replacements made in the protected comment provide adequate protection, too little protection of confidential information, or too much protection of information that is not confidential in the protected comment received from confidential protection program 121. In various embodiments, confidential protection plug-in 132 displays the protected comment (e.g., user generated text) with jargons and other replacements of potentially confidential information (e.g., includes shortened URLs, detached file locations, etc.) identified for the user. For example, as depicted in FIG. 4B, confidential protection program 121 displays the comment as proposed protected comment or text with the registered confidential information, the potentially confidential information or target words, and the numerical value strings with the jargons and random character strings provided as substitutions in a box above the registered confidential and potentially confidential information (e.g., target words) identified to be removed. In various embodiments, confidential protection plug-in 132 may include a pop-up menu, an icon, a button, a pull-down menu, or the like to the user to select "accept," "edit," or "full encryption." If, for example, the user selects "accept" using UI 133 in confidential protection plug-in 132, confidential protection plug-in 132 sends a notification of user approval to confidential protection program 121.

Responsive to receiving user approval (yes branch, decision 212), confidential protection program 121 sends the protected comment to computer 130 via confidential protection plug-in 132 (216) for delivery to the addressed destination and waits to receive another comment (201) as previous discussed above. In various embodiments, confidential protection plug-in 132 sends the protected comment for distribution in external web service 140. In some embodiment, computer 130 sends the user approved protected user generated text (e.g., email, SMS, etc.) via an email system or mobile communication system to the addressed destination.

In response to determining that confidential protection program 121 does not receive user approval (no branch, decision 212) from confidential protection plug-in 132 for the protected comment with the provided replacements of confidential and potentially confidential information (e.g., replaced target words, images, date strings, etc.), confidential protection program 121 either encrypts or saves identified changes and updates the jargon dictionary (214) based, at least in part, on the user selection and edits received from confidential protection plug-in 132.

In response to receiving from confidential protection, plug-in 132 a user selection of full encryption, confidential protection program 121 encrypts the comment using the encryption algorithms discussed in step 207 to fully protect the comment by completely encrypting the information in comment.

In an embodiment, if the user selects "edit" in confidential protection plug-in 132, then confidential protection plug-in 132 provides an edit mode where the user may select a word or words, which may or may not be jargon, a phrase, numbers or characters and inputs an alternative word or words, numbers, or symbols to replace the selected word(s), numbers or characters. In various embodiments, the user, while in edit mode of confidential protection plug-in 132, the user may not approve all of the provided replacements for confidential and potentially confidential information in the protected user generated text received from confidential protection program 121.

For example, by selecting one or more of the highlighted or identified original confidential or potentially confidential information in a displayed comment that are to be protected and then, selecting an icon, or the like to indicate that selected highlighted confidential information and target words for replacement are determined "not confidential" by the user. The selected highlighted confidential information and/or target words in the protected comment is not considered confidential and should not be replaced by confidential protection program 121 upon return. The highlighted original words de-selected or identified as non-confidential information by the user will be included in the edited protected comment or user generated text sent back to confidential protection program 121 when the user, for example, selects "done" or "complete" in a pop-up menu, etc. in confidential protection plug-in 132 indicating edits are complete. Upon receipt of the edited protected comment from computer 130, confidential protection program 121 removes the jargons corresponding to the user indicated words, numbers, or date strings marked "not confidential" by the user of computer 130 and accordingly updates or edits the jargons dictionary.

Similarly, while in edit mode in confidential protection plug-in 132, the user may select, for example, using a pull-down menu or the like, one or more additional words (e.g., words not already identified as confidential by confidential protection program 121) as confidential information or confidential words that require a jargon. In various embodiments, in confidential protection plug-in 132, the user selects an icon, a selection on a pull-down menu or the like that indicates to confidential protection program 121 the selected words are confidential and requiring jargons (e.g., confidential protection program 121 needs to generate jargons for the selected word(s), numbers, or characters). In various embodiments, confidential protection plug-in 132, upon receiving a user input indicating edit mode completion, sends the edited protected user generated text back to confidential protection program 121 and upon receipt of an edited protected user generated text with user identified additional confidential information, confidential protection program 121 returns to jargon generation (208) to generate jargons for the user identified additional confidential information received from computer 130.

In response to receiving the edited protected comment or user generated text from computer 130, confidential protection program 121 either returns to jargon generation (208) or saves the identified changes/edits to the protected comment and accordingly, updates the jargon dictionary (214) with the user provided changes to jargon in the protected comment.

Similarly, in some embodiments, confidential protection program 121 receives user approval or user input of edits or full encryption of a user generated text from an email program or a messaging service (e.g., SMS). For example, confidential protection program 121 provides a protected user generated text or email to the user on computer 130 for approval. As discussed above the user on computer 130 may approve, edit or request full encryption and send the approval, full encryption request, or edited email back to confidential protection program 121 for encryption, saving and updating jargon dictionary.

Responsive to either receiving user approval or implementing user instructed changes received from computer 130, in various embodiments, confidential protection program 121 sends the protected comment to computer 130 via confidential protection plug-in 132 (216) for delivery as previously discussed.

In one embodiment, confidential protection program 121 receives all comments, messages, emails, and the like in step 202 (for distribution to an external network address or in network 110) and performs steps 202 to 216 prior to distribution of the user generated text with protected confidential information.

In an embodiment, computer 130 resides not in a protected in-house network 110A but, is outside of firewall 160 (e.g., resides in network 110, an unprotected network) without direct access to server 120. In this embodiment, partial protection using confidential protection program 121 on server 120 is not possible and in this case, encryption of comments or user generated text is required or may be selected by a user inputting to external web service 140. In the embodiment, confidential protection program 121 as used by a remote user (e.g., not in in-house network 110A) may decode a received protected comment from external web service 140 to the extent that jargon and corresponding registered confidential information or target words are stored in computer 130 cache or persistent storage (e.g., cache 514 and persistent storage 508 in FIG. 5).

While most of the above discussions of a method to protect confidential information in user generated text are associated with confidential protection program 121 on server 120, in one embodiment, a confidential protection program resides on computer 130. In an embodiment, the confidential protection program on computer 130 provides text analysis, jargon dictionary, stores text analysis results on server 120 and accesses a word concept or category dictionary and URL shortening service on server 120 or on the Internet. In this embodiment, confidential protection program on computer 130 periodically, such as daily, queries server 120 for updates to the team jargon dictionary (e.g., either receives each new registered confidential information and target word with corresponding jargon or receives a new jargon dictionary and deletes the old jargon dictionary).

FIG. 4A is an illustration of an example of a user input comment in external web service 140, in accordance with an embodiment of the present invention. A user types comment 402A in channel test 401 of external web service 140. In this example, channel test 401 is a channel in a cloud-based team collaboration tool used by a team for collaboration on software test related issues. A team member types in comment 402A in external web service 140 using confidential protection plug-in 132 (e.g., depicted in FIG. 1 on computer 130) and presses "send." In response, confidential protection plug-in 132 automatically holds the distribution of comment 402A in external web service and sends comment 402A to confidential protection program 121 (e.g., depicted in FIG. 1 on server 120). Confidential protection program 121, using the steps discussed with respect to FIGS. 2 and 3, identifies and marks the registered confidential information as "search button", "WEX V11" and "NPE" and identifies "bug" as a target word. Confidential protection program 121 identifies the numbers "1532" as a numerical value string or a series of numbers that may be confidential.

FIG. 4B is an illustration of an example of proposed protected comment 402B sent to computer 130, in accordance with an embodiment of the present invention. Confidential protection program 121, using the steps for generating unassociated words or jargon as discussed, with reference to FIGS. 2 and 3, retrieves jargons for the registered confidential information using jargon dictionary. Confidential protection program 121 extracts each jargon corresponding to the identified confidential information from a team jargon dictionary and places the jargon above the corresponding registered confidential information (e.g., jargon "dog head" corresponding to "search button", jargon "Oze" for corresponding "WEX V11", and jargon "prize lot" corresponding to "NPE"). For the identified target word, "bug," which has an edit distance greater than a minimum threshold edit distance, confidential protection program 121 randomly selects a word, "car" from an unused jargon category, for example, "motorized vehicles" and places "car" over the target word "bug." Confidential protection program 121 generates a random number string, for example, "9841" and places "9841" above "1532" in proposed protected comment 402B. Confidential protection program 121 sends proposed protected comment 402B to the user on computer 130 for approval.

FIG. 4C is an illustration of an example of user approved protected comment 402C sent to external web service 140, in accordance with an embodiment of the present invention. In response to receiving the user approval of proposed protected comment 402B, confidential protection program 121 creates a user approved protected comment or text by removing the identified registered confidential information, removing the target word, and the originally input series of numbers "1532" and replacing with the jargons (e.g., dog head, Oze, and prize lot), generated jargon (car), and the random number string (e.g., 9841) for user approved protected comment 402C. In an embodiment, confidential protection program 121 marks substituted words and number strings with hidden characters. For example, "prize lot' and "9841" may be marked with a zero width space of Unicode (e.g., [U+200B]prize lot[U+200B]). In this example, confidential protection program 121 sends user approved protected comment 402C back to confidential protection plug-in 132 to distribute via external web service 140.

Figure 5:
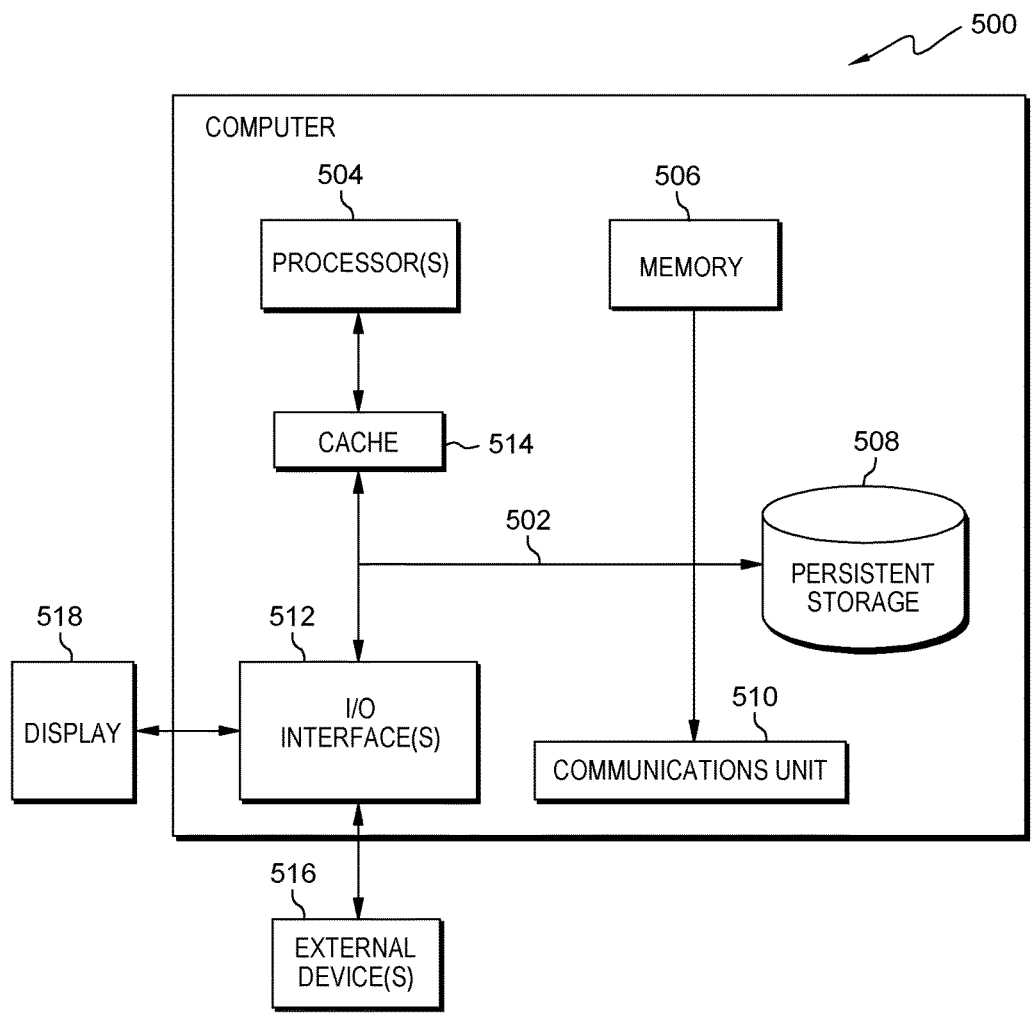
FIG. 5 is a block diagram depicting components of a computer system in accordance with at least one embodiment of the present invention.

FIG. 5 is block diagram 500 depicting components of a computer system in accordance with at least one embodiment of the present invention. As depicted, FIG. 5 depicts the components of a computer system, which is an example of a system such as server 120 and computer 130 within distributed data processing environment 100, in accordance with an embodiment of the present invention. It should be appreciated that FIG. 5 provides only an illustration of one implementation and does not imply any limitations, with regard to the environments, in which different embodiments can be implemented. Many modifications to the depicted environment can be made.

Server 120 and computer 130 can include processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510 and input/output (I/O) interface(s) 512.

Communications fabric 502 can be implemented with any architecture designed for passing data and/or control information between processors (such as microprocessors, communications and network processors, etc.), system memory, peripheral devices and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data and near recently accessed data, from memory 506.

Program instructions and data used to practice embodiments of the present invention are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory or any other computer readable storage media, that is capable of storing program instructions or digital information.

The media used by persistent storage 508 may also be removable. For example, a removable hard drive may be used for persistent storage 508. Other examples include optical and magnetic disks, thumb drives and smart cards that are inserted into a drive for transfer onto another computer readable storage medium that is part of persistent storage 508.

Communications unit 510, in these examples, provides for communications with other data processing systems or devices, including resources of serve 120, computer 130, and external web service 140 and other computing devices not shown in FIG. 1. In these examples, communications unit 510 includes one or more network interface cards. Communications unit 510 may provide communications with either or both physical and wireless communications links. Program instructions and data used to practice embodiments of the present invention may be downloaded to persistent storage 508 through communications unit 510.

I/O interface(s) 512 allows for input and output of data with other devices that may be connected to server 120, computer 130, or external web service 140. For example, I/O interface(s) 512 may provide a connection to external device(s) 516 such as a keyboard, a keypad, a touch screen, a microphone, a digital camera and/or some other suitable input device. External device(s) 516 can also include portable computer readable storage media, for example, devices such as thumb drives, portable optical or magnetic disks and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a as a display of computer 130.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein, with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function, in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products, according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A method comprising:
receiving, by one or more computer processors, from a first computer, text generated by a user wherein the text generated by the user is one of: text input on an external web service generated from a plug-in to a client program that is a browser on the first computer, an email from a plug-in to the client program that is one of an email program or an email application on the first computer, and a message from a plug-in to the client program that is one of a messaging program or a messaging application on the first computer;
identifying, by one or more computer processors, in the text generated by the user, one or more confidential information registered in a dictionary, wherein the dictionary contains a plurality of registered confidential information and a plurality of substitute words corresponding to the plurality of registered confidential information;
retrieving, by one or more computer processors, from the dictionary, one or more substitute words corresponding to each identified registered confidential information of the one or more confidential information registered in the dictionary;
identifying, by one or more computer processors, in the text generated by the user, whether one or more words are potentially confidential based, at least in part, on a text analysis of the text generated by the user;
generating, by one or more computer processors, one or more words for each of the one or more potentially confidential words, wherein the one or more generated words are determined based, at least in part, on determining an edit distance is less than a threshold edit distance;
determining, by one or more computer processors, for each of the one or more potentially confidential words with the edit distance less than the threshold edit distance, the registered confidential information associated with a shortest edit distance;
retrieving, by one or more computer processors, from the dictionary, the one or more substitute words corresponding to the registered confidential information with the shortest edit distance;
determining, by one or more computer processors, a category of the one or more substitute words corresponding to the registered confidential information associated with the shortest edit distance;
retrieving, by one or more computer processors, a list of unused words in the category of the one or more words corresponding to the registered confidential information associated with the shortest edit distance;
selecting, by one or more computer processors, one or more words from the list of unused words in the category of the one or more retrieved substitute words corresponding to the registered confidential information with the shortest edit distance based, at least in part, the text analysis identifying a highest topic index of the one or more words from the list of unused words in the category of the one or more retrieved substitute words corresponding to the registered confidential information associated with the shortest edit distance;
sending, by one or more computer processors, to the first computer, a proposed protected text, wherein the proposed protected text includes the text generated by the user with each of the identified registered confidential information included with each of the one or more retrieved substitute words to replace the identified confidential information and each of the one or more potentially confidential words included with each of the one or more generated words to replace the one or more potentially confidential words;
receiving, by one or more computer processors, from the first computer, at least one of: one of more edits to the proposed protected text input by the user and an indication of an approval by the user of the proposed protected text;
responsive to receiving, from the first computer, the one of more edits to the proposed protected text input by the user, performing, by one or more computer processors, the one or more edits to the proposed protected text input by the user;
generating, by the computer, one or more substitute words for each of the one of more edits to the proposed protected text input by the user, wherein the one or more generated substitute words are determined based, at least in part, on determining an edit distance is less than a threshold edit distance;
responsive to receiving, from the first computer, the indication of the approval by the user of the proposed protected text, creating, by one or more computer processors, a user approved protected text, wherein the user approved protected text includes replacing each of the identified registered confidential information in the proposed protected text with the one or more retrieved substitute words corresponding to the identified registered confidential information of the one or more confidential information registered in the dictionary, replacing each of the one or more potentially confidential words in the proposed protected text with the one or more generated words to replace each of the one or more potentially confidential words, and replacing the additional registered confidential information indicated by the one or more edits to the proposed protected text input by the user with the one or more generated substitute words for each of the additional registered confidential information indicated by the one of more edits to the proposed protected text input by the user;

sending, by one or more computer processors, the user approved protected text to the first computer;

identifying, by one or more computer processors, each of the one or more potentially confidential words replaced in the user approved protected text as registered confidential information with the one or more generated words replacing each of the one or more potentially confidential words in the user approved protected text and each of the additional registered confidential information indicated by the one or more edits to the proposed protected text input by the user with the one or more generated substitute words for each of the additional registered confidential information indicated by one of more edits to the proposed protected text input the by the user; and updating, by one or more computers processors, the dictionary to include each of the one or more potentially confidential words replaced in the user approved protected text as registered confidential information with the one or more generated words replacing each of the one or more potentially confidential words in the user approved protected text and each of the additional registered confidential information in the proposed protected text identified by the one of one of more edits as registered confidential information with the with the one or more generated substitute words replacing each of the additional registered confidential information in the user approved proposed protected text.

* * * * *